United States Patent [19]

Hannes et al.

[11] 4,129,674

[45] Dec. 12, 1978

[54] FIBROUS MAT ESPECIALLY SUITABLE FOR ROOFING PRODUCTS AND A METHOD OF MAKING THE MAT

[75] Inventors: George J. Hannes, Maumee; Theodore R. Rohweder; Hans W. Dreikorn, both of Toledo, all of Ohio; Philip B. Shepherd, Sedalia, Colo.

[73] Assignee: Johns-Manville Corporation, Denver, Colo.

[21] Appl. No.: 712,632

[22] Filed: Aug. 9, 1976

Related U.S. Application Data

[60] Continuation of Ser. No. 650,109, Jan. 19, 1976, abandoned, which is a continuation of Ser. No. 486,123, Jul. 5, 1974, abandoned, which is a division of Ser. No. 301,578, Oct. 27, 1972, abandoned.

[51] Int. Cl.² .............................................. B04D 1/00
[52] U.S. Cl. .................................. 428/285; 52/309.3; 162/149; 428/291; 428/297; 428/303; 428/440; 428/489

[58] Field of Search ............. 428/220, 280, 281, 282, 428/285, 291, 297, 298, 302, 440, 489, 910, 303; 106/50; 52/309; 162/149, 156

[56] References Cited

U.S. PATENT DOCUMENTS

| | | | |
|---|---|---|---|
| 2,477,555 | 7/1949 | Roberts et al. | 428/392 |
| 2,859,109 | 11/1958 | Hawley et al. | 162/145 |
| 3,684,645 | 8/1972 | Temple et al. | 428/220 |
| 3,853,683 | 12/1974 | Stapleford et al. | 428/293 |

*Primary Examiner*—James J. Bell
*Attorney, Agent, or Firm*—Robert M. Krone; Joseph J. Kelly

[57] ABSTRACT

An economical and uniform fibrous glass mat displaying improved tear strength and a wet forming process of making such a mat is disclosed herein. The mat, which is especially suitable as a carrier material in the manufacture of asphalt shingles or other such roofing products, includes a web of base fibers comprising individual monofilament glass fibers and reinforcement fibers in the form of glass fiber bundles interspersed throughout the web in a randomly oriented pattern. The mat also includes a binder substance to assist in holding the base fibers and reinforcement fiber bundles together.

6 Claims, 3 Drawing Figures

FIBROUS MAT ESPECIALLY SUITABLE FOR ROOFING PRODUCTS AND A METHOD OF MAKING THE MAT

This is a continuation of application Ser. No. 650,109, filed Jan. 19, 1976, now abandoned, which is a continuation of application Ser. No. 486,123, filed July 5, 1974 (now abandoned) which is a divisional of application Ser. No. 301,578 filed Oct. 27, 1972, abandoned.

BACKGROUND OF THE INVENTION

1. Field of the Invention

The present invention relates generally to fibrous glass mats and more particularly to an improved fibrous glass mat especially suitable for use in roofing shingles and a method of making such a mat.

2. Description of the Prior Art

In the past, most asphalt roofing shingles were constructed of organic rag felt impregnated and coated with asphalt or other such bituminous substance, the rag felt, in most cases, being made on a cylinder paper machine. More recently, the demand for and production of this type of shingle has increased substantially. For example, in 1961, the industry produced and sold approximately 40 million squares of asphalt shingle for customer use. A square covers 100 square feet of roof area and, in 1961, cost the contractor approximately 7 dollars. In 1971, approximately 57 million squares of asphalt shingles were produced and sold at a cost of about 9 dollars a square. The estimated industry production and sale of asphalt shingles in 1981 is approximately 74 million squares. It should be apparent from these figures that the asphalt roofing market is highly significant and growing at a rapid rate.

In responding to the aforestated increase in demand and production of asphalt roofing material, industry has found that the addition of new cylinder paper machines for producing rag felt is very expensive. Further, in depleting the supply of materials needed in making rag felt, the latter has itself become more expensive. For these reasons, industry has taken a look at other types of shingle mats and particularly mats made of fiber glass.

In developing a new type of glass mat especially suitable for roofing shingles, there are three basic objectives which should be achieved. Firstly, the glass mat should be inexpensive so that competitively priced shingles can be produced. Secondly, the glass mat should be uniform so as to avoid production discontinuity and waste which otherwise increases the manufacturing cost of the mat and therefore the shingle. Thirdly, the mat should display sufficient tearing resistance for maintaining integrity and resistance against blow-offs of the applied shingles under severe wind conditions.

Heretofore, the prior art has not satisfactorily met all three of the foregoing objectives. For example, one suggestion has been to provide a steam-blown glass fiber mat. While this type of mat is relatively inexpensive to manufacture, it has been found to display unsatisfactory tear resistance, thereby resulting in a shingle highly susceptible to blow-off. On the other hand, a dry forming process swirl reinforced mat utilizing a web of base fibers and swirled continuous glass filaments as reinforcement fibers has also been suggested by the prior art. While the latter type of mat has been found to display better tear resistance than the steam-blown mat, the dry process utilized in forming such a mat is expensive and slow. Due to relatively low production output and relatively high labor requirements utilized with this process, the ultimate product is relatively expensive. In addition, it has been found that this type of mat is not reliably uniform in production, resulting in production discontinuity and waste and therefore unnecessary cost and delay. For the most part, the prior art has been unable to produce such a mat other than by the dry process. This drastically limits the ability to adequately disperse the reinforcement fibers throughout the base fiber web, resulting in a limitation on the tear strength of the ultimately produced mat.

Even in view of the foregoing deficiencies, industry has continued to look towards glass mat for the production of asphalt shingles. For example, in 1961, the use of glass mat for this purpose was substantially non-existent. In 1971, approximately 250,000 squares of asphalt shingles with glass mat were produced and sold. The projection for 1981 is that approximately 11 million squares of asphalt shingle using glass mat will be produced and sold in that year. Because of this increased demand for roofing shingles and mat generally and glass mat in particular, competition in this field has become keener. In addition, the capability to produce a more economical and uniform mat with satisfactory tear resistance has become increasingly more important.

As will be seen hereinafter, the present invention has overcome many of the problems left unsolved in the prior art by providing a fibrous glass mat which is more economically and uniformly produced and which displays improved tear resistance. In this manner, a more economical and higher quality shingle can be produced.

OBJECTS AND SUMMARY OF THE INVENTION

In accordance with the foregoing, an object of the present invention is to provide an economical method of making a uniform fibrous glass mat displaying improved tear resistance.

Another object of the present invention is to provide such a mat displaying uniformity and improved tear resistance.

Yet, another object of the present invention is to provide a roofing product utilizing the aforestated mat such that the roofing product is economical and displays improved blow-off resistance.

As will be seen in more detail hereinafter, these objects, as well as other objects and features, are attained and many of the deficiencies of the prior art are eliminated by the present invention which sets forth a wet forming process of making a fibrous glass mat especially suitable for use in shingles. The mat comprises a web of monofilament glass fibers and elongated glass fiber bundles having ends and binder substance to assist in holding the monofilament fibers and fiber bundles together. By making such a mat by the particular process of the present invention, the mat can be made in a more economical and uniform manner. Further, the glass fibers and fiber bundles are dispersed in a randomly oriented fashion throughout the web and a majority of the ends of the fiber bundles are within the confines of the web. This, in turn, increases the tearing resistance of the mat and therefore the blow-off resistance of a shingle made with the mat.

DETAILED DESCRIPTION

Figure 1:
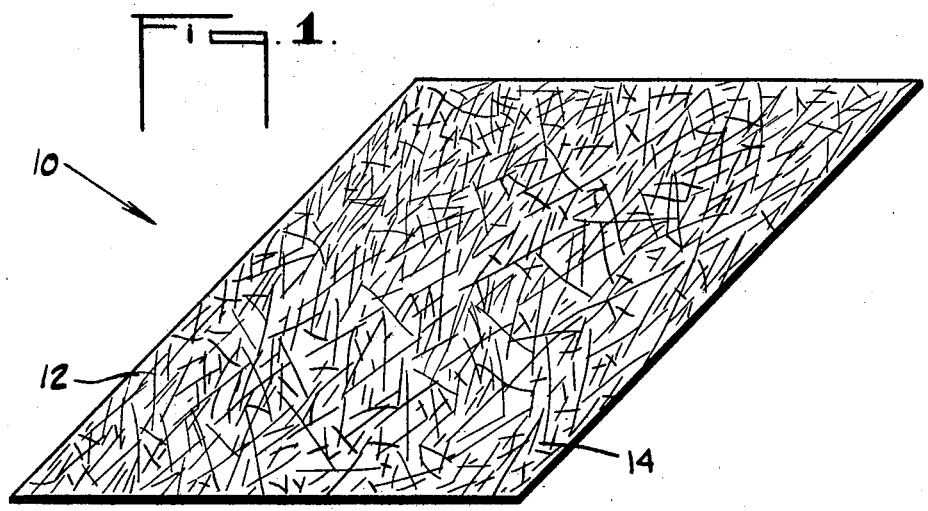
FIG. 1 is an enlarged perspective view of a fibrous glass mat designed in accordance with the present invention.

Turning to the drawings, a fibrous glass mat constructed in accordance with the present invention is illustrated in FIG. 1 and generally designated by the reference numeral 10. The mat is comprised of a web 12 of monofilament glass fibers (base fibers) and elongated glass fiber bundles 14 (reinforcement bundles) having ends, the glass fibers and fiber bundles being dispersed throughout the web in a randomly oriented pattern. In addition, a suitable binder substance is provided to assist in holding the base fibers and reinforcement bundles together. The glass fiber bundles, a majority of which have their opposite ends terminating well within the confines of the web, provide highly satisfactory tear resistance to the mat, especially where the latter is used as part of an asphalt shingle.

As will be described in more detail hereinafter, fibrous glass mat 10 is made by forming a slurry, preferably a water slurry, including the base fibers and reinforcement bundles such that the solids content of the slurry is very low, preferably approximately 0.2%. Under intense agitation, the base fibers and reinforcement bundles are substantially completely dispersed throughout the slurry. After this dispersing operation, the fiber containing slurry is applied to a moving screen where, by means of vacuum, a majority of the water is removed resulting in the aforedescribed web of base fibers and reinforcement bundles. After formation of the web, a binder substance is applied thereto so as to assist in bonding the fibers and fiber bundles together. Thereafter, the bonded web is passed through a dryer for evaporating any water remaining in the web and for curing the binder.

It should be noted that by providing a fibrous slurry, and preferably a slurry of low fiber content, a highly uniform mat can be produced, especially in comparison to the less uniform mat formed by the dry forming process. This, of course, minimizes production discontinuity and product wastage and therefore minimizes manufacturing cost. In addition, by providing this slurry, the reinforcement bundles, that is, the glass fiber bundles can be readily dispersed throughout the web in the manner described above, thereby resulting in a mat with improved tear resistance. Further, by providing a wet forming process of the type described herein, the rapidity of production can be substantially increased over that of the dry forming process, in some cases ten fold, and the requirement of producing base fibers simultaneously with the production of the mat can be eliminated. Both of these latter features maximize efficiency and minimize cost in mat production.

Having briefly described the fibrous glass mat 10 and process for making the same in accordance with the present invention, attention is now directed to a more detailed analysis of the components making up the mat. In this regard, attention is directed to the base fibers which, as set forth above, are monofilament glass fibers. These monofilament fibers are pre-chopped to desired lengths from continuous strands, preferably in an independent operation apart from and unrelated to the forming operation of mat 10. This independent operation has been found to be less costly than the simultaneous production of base fiber and mat typically carried out in the dry forming process of a glass mat. As will be seen hereinafter, the strands break up into individual monofilament fibers when placed in the slurry.

While there is no absolute limitation on discrete length of the monofilament fibers, a preferred broad range is between approximately 12 mm and 60 mm. With respect to monofilament fibers below 12 mm, it has been found that the chopping machinery used to date has been unable to satisfactorily chop the continuous filaments to such shorter lengths. On the other hand, monofilament fibers above approximately 60 mm tend to cause fiber entanglement in the slurry and poor dispersion. It has been found that the best operating range is between approximately 22 mm and 35 mm.

Like the length of the monofilament glass fibers or base fibers, there is no absolute limitation on the diameter of these fibers. However, due to practical and economical considerations, they are preferably between approximately $12\mu$ and $19\mu$ in diameter. This range includes the K, M and P filaments, all of which are readily available and economical to use. In addition, the density of the ultimately produced mat is related to the diameter of the base fibers and therefore can be regulated by the proper selection of base fiber diameter.

The preferred amount of base fiber used in mat 10 is dependent upon the amount of fiber content provided by the reinforcement fiber bundles. Hence, this will be discussed hereinafter with respect to the detailed discussion of the latter.

Attention is now directed to the elongated glass fiber bundles or reinforcement bundles. Each of these bundles is made from a plurality of monofilament glass fibers which are preferably in the diameter range of approximately $12\mu$ to $19\mu$ for the same reasons discussed above. The exact number of monofilaments provided in each bundle will depend upon the desired strength and thickness of the latter. A good working range has been found to be between approximately 20 and 300 microfilaments per bundle. Since it is important to keep these bundles intact throughout the mat forming process, they are coated with a water or other such liquid insoluble binder of known kind. This keeps the bundles bonded together even when exposed to the forming slurry.

There is no absolute limitation on the length of the glass fiber bundles. However, when the fiber bundles are below approximately 15 mm in length, their function as a reinforcement is, in many cases, unreliable, especially where the ultimately produced mat is to be used as part of a roofing shingle. On the other hand, when the bundles are above approximately 100 mm in length, they tend to tangle up in the slurry. As a good operating range, the fiber bundles are preferably between approximately 65 mm and 75 mm in length.

As stated above, the amount of monofilament base fibers in mat 10 will depend upon the fiber content of the reinforcement bundles. In this regard, of the total fiber content (by dry weight) attributed to the base fibers and fiber bundles, there can be as little as 5% fiber content attributed to the bundles or as much as 90%. Below 5%, the fiber bundles do not contribute any significant reinforcement to the mat and above 90% the fibers tend to provide an overly dense and non-uniform mat.

Where the contemplated use for mat 10 is the carrier material for an asphalt shingle, the preferred range of fiber content attributed to the fiber bundles is between approximately 5% and 30% (by dry weight). With this range, there is adequate reinforcement for improved tear resistance in the ultimately produced mat but the mat is not so dense to be unsuitable for shingle use. Within this latter range, a highly satisfactory mat for use in shingles has been found to include approximately 15% fiber content attributed to the reinforcement bundles.

As stated above, the foregoing percentages of fiber content are those attributed to the fiber bundles in relation to the total of base fibers and fiber bundles. Hence, the amount of base fiber in any given mat can be readily calculated from the amount of fiber comprising the reinforcement bundles. These percentages will, of course, decrease when the binder is taken into consideration. In this regard, mat 10 includes a binder to cooperate in holding the monofilament base fibers and fiber bundles together. The amount of binder provided will depend upon the use of the ultimately formed mat. As a general range, the mat may include binder as low as 3% of the total dry weight of the mat or as high as 45%. For use in shingles, however, best results are attained by using binding substance in an amount equal to approximately 15% of the total dry weight of the mat. An amount substantially less than this figure does not adequately hold the fibers together while an amount substantially greater than this figure does not appear to be necessary. Any suitable binder known by those skilled in the art can be used, such as, for example, urea-formaldehyde.

Figure 2:
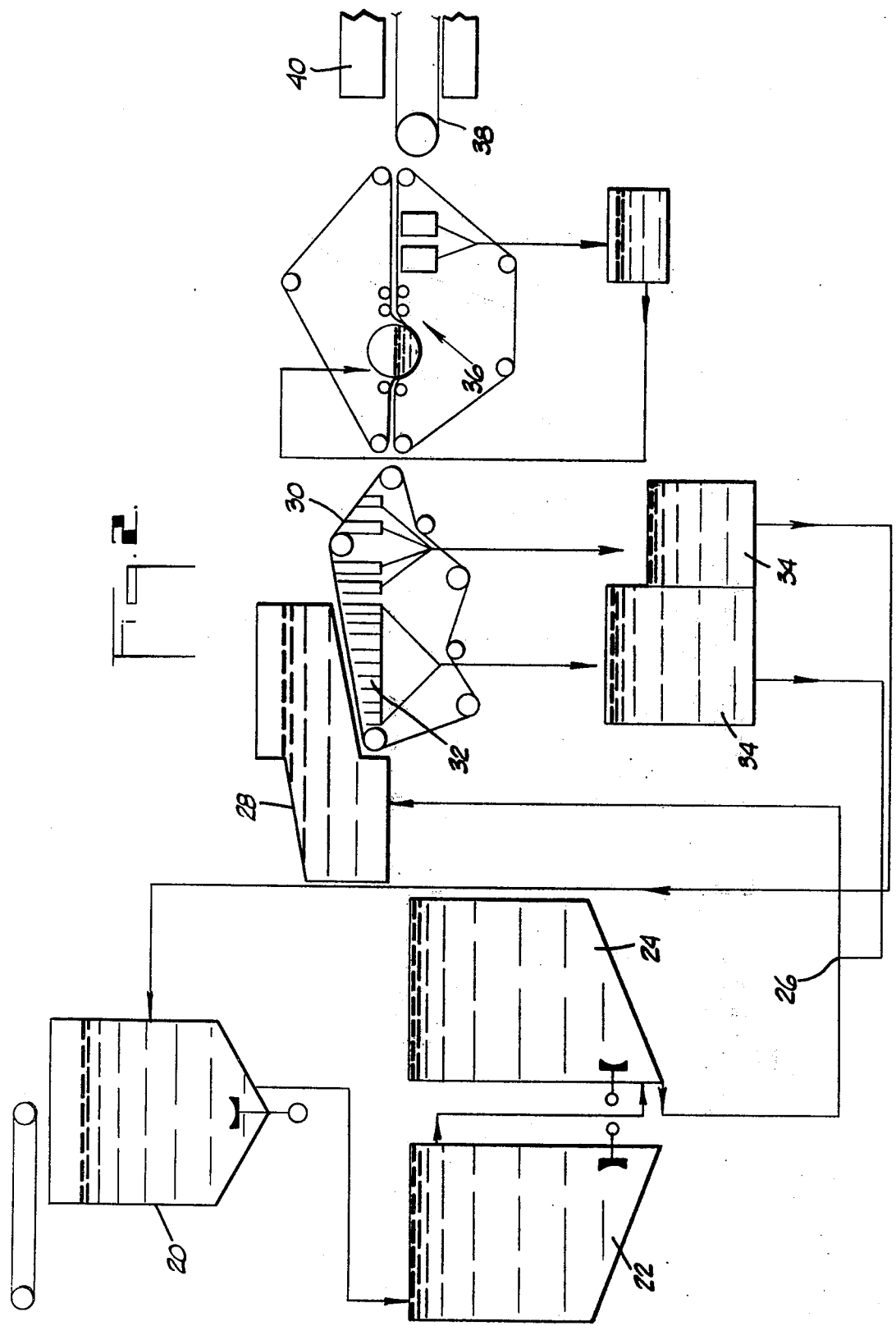
FIG. 2 is a schematic illustration of a method of making the mat in accordance with the present invention.

With fibrous glass mat 10 constructed in the foregoing manner, attention is now directed to FIG. 2 which illustrates a method of making the mat in accordance with the present invention. Specifically, the aforedescribed monofilament base fibers which are compressed together in bundles and reinforcement fiber bundles, having been provided and chopped to the preferred lengths, are dispersed into an opening mixing tank 20 which includes a water slurry. A suitable dispersant such as, for example, a cationic surfactant, for example AEROSOL, is also introduced into the slurry. At this point, the bundles of monofilament base fibers start to separate into individual monofilaments in the slurry. Both types of fiber are carefully metered into the tank in constant relation to the slurry so as to maintain an exact, preferably very low, fiber concentration. In fact, a preferred fiber concentration is approximately 0.2%. The metering operation also measures and limits the relative amounts by weight of base fibers to reinforcement fiber bundles to be provided in the slurry, such as, for example, 85% base fibers to 15% fiber bundles.

From opening tank 20, the fibrous slurry is passed through two larger tanks, a pre-mixing tank 22 and a main mixing tank 24, where it is intensely agitated so as to cause the bundles of monofilament base fiber to completely break up and to achieve complete dispersion of the fibers generally. As the dispersed fibrous slurry passes downstream from main tank 24, the fiber concentration is further reduced at point 26 by introduction of additional water. At this point the fiber concentration is preferably approximately 1/20th of the original slurry concentration.

From point 26, the slurry passes to a conventionally known head box or hydroformer 28. In the hydroformer, the fibrous slurry passes over a moving wire screen arrangement 30 where most of the water is removed by vacuum, as indicated at 32, thus forming a web of base fibers and reinforcement bundles. The water removed by vacuum enters either of two recycle tanks 34 where it can be recirculated to opening tank 20 and point 26.

After the web is formed on moving screen 30, it is moved downstream where a binder is applied thereto by means of a conventional applicator device 36 which, as illustrated, may provide recirculation of excess binder. Downstream from applicator device 36, the boned fibrous mat is transferred to a moving conveyor 38 which passes the mat through a drying oven for evaporation of water contained in the mat and curing of the binder.

As set forth above, the reinforcement fiber bundles are pre-chopped and introduced to the slurry in the opening tank 20. It is to be understood that the fiber bundles could also be introduced into the premixing tank 22, main mixing tank 24 or directly into the hydrformer 28. However, it has been found that introduction into the opening tank provides best dispersion of the fibers.

The foregoing method of making mat 10 is both rapid and economical, especially compared to the dry forming process of making the aforedescribed swirl reinforced mat. In addition, by using a slurry of low fiber concentration in producing mat 10, mat uniformity can be readily and consistently attained. Further, the slurry of low fiber concentration allows the fiber bundles to disperse throughout the web of monofilament base fibers in a randomly oriented pattern such that a substantial number of the bundles have their ends terminating well within the confines of the web. This substantially increases the tear resistance of the ultimately produced mat, as will be shown with respect to FIG. 3.

After mat 10 has been made, it can be used for many different purposes. However, a major use for the mat is its incorporation into bituminous roofing products generally and asphalt roofing shingles in particular. In this case, the mat is preferably 0.035 inches thick and preferably displays a weight of approximately 2.05 lbs./100 sq. ft. As stated above, the weight is best regulated by regulating the diameter of the aforedescribed monofilament base fibers. Hence, it has been found that base fibers displaying a diameter between approximately $14\mu$ and $16\mu$ are satisfactory to achieve this weight.

The specific methods of making asphalt shingles or other roofing products with glass mat are well known to those skilled in the art. Hence, a specific discussion of these methods will not be given herein. It shall suffice to state that in all cases the mat is coated with asphalt or other bituminous substance. The amount and type of asphalt or other such bituminous substances used will depend on the particular roofing product made.

Figure 3:
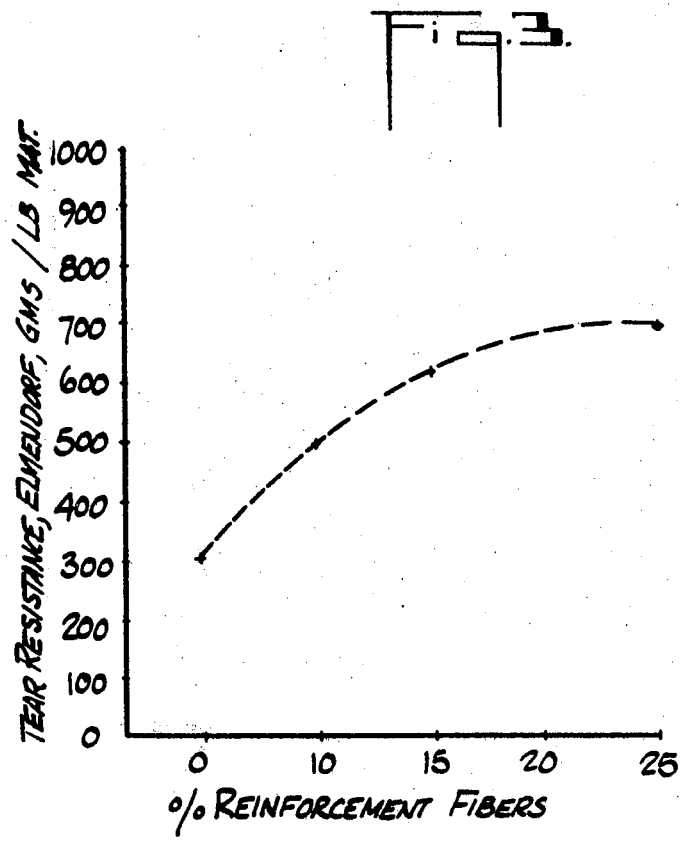
FIG. 3 is a graphic illustration displaying tear resistance of an asphalt shingle made with a glass mat of the present invention.

Attention is now directed to FIG. 3 which graphically illustrates the tear resistance of asphalt shingles using glass mat of the present invention, however, with varying amounts of reinforcement fiber bundles. More specifically, over forty asphalt shingle samples were prepared from mats. The mats of these shingles had approximately the same weight (2.00 – 2.40 lbs./100 sq. ft.), approximately the same length monofilament base fiber (30 mm) and reinforcement fiber bundle (70 mm) and used the same amount and type of binder. The mats for the shingles were made in the manner described above. However, the amount of fiber content attributed to the reinforcement bundles and the amount of fiber content attributed to the monofilament base fiber have been varied to display their affect or tear resistance. Specifically, samples were made with 0%, 5%, 10%, 15%, 20% and 25% dry weight fiber content attributed to the reinforcement fiber bundles of the total of base fiber and reinforcement fiber. Hence, the samples respectively included 100%, 95%, 90%, 85%, 80% and 75% fiber content attributed to the base fiber. All of these samples were tested for tear resistance (in grams/lb. mat on an Elmendorf type apparatus in accordance with ASTM No. 1224 Standards.

The results have been graphically displayed in FIG. 3 when a Cartesian coordinate is shown. The abscissa represents the percent of fiber attributed to the reinforcement bundles and the ordinate represents the tearing resistance attained for the given samples in grams/lb. mat. It should be noted that for each percentage of reinforcement fiber, a number of test samples were pro-vided, compiled and averaged out for purposes of the graph. Upon inspecting the graph, it can be seen that the average tear strength of those shingles without reinforcement fiber bundles is approximately 320 grams/lb. mat. At 10% fiber bundle content, tear resistance improves. This improvement continues as more bundles are provided. Hence, at 25% fiber bundle content, the tear strength is approximately 690 grams/lb. mat. At between 10% and 25%, the shingle displays tear resistance as good and in many cases better than that found with the previously described swirl mat and, in addition, has the other advantages described above.

It is to be understood that the foregoing graphic display of tear resistance is for illustrative purposes only. It is set forth only to show how tear resistance is related to the glass mat of the present invention and particularly the reinforcement fiber bundles used with the glass mat.

Claims are as follows:

We claim:

1. In a roofing product having as its base a fibrous glass mat coated on both sides with bituminous material, said mat being of the type (1) which is relatively thin, for example approximately 0.035 inch thick, (2) which includes both monofilament glass fibers and glass fiber bundles and a binder substance to cooperate in holding the monofilament fibers and fiber bundles together to form said mat, and (3) which is made by a process of preparing a dilute water slurry including said monofilament fibers and fiber bundles, vacuum filtering said slurry through a moving wire screen to from a web which together with said binder forms said mat, the improvement comprising the utilization of:
    (a) a plurality of individual monofilament glass fibers between approximately 22 mm and 35 mm in length and between approximately 12 microns and 19 microns in diameter, said fibers comprising between approximately 70% and 95% of the total fibrous material in said web,
    (b) a plurality of glass fiber bundles having ends, each of said bundles consisting essentially of a plurality of monofilaments held together in said bundle by a water insoluble binder substance, said glass fiber bundles being between approximately 65 mm and 75 mm in length, and comprising between approximately 5% and 30% of the total fibrous material in said web; and
    (c) a relatively small amount of binder substance to cooperate in holding said web of monofilament fibers and fiber bundles together to form said mat;
    (d) said mat consisting essentially of said monofilament fibers, said fiber bundles and said binder and said monofilament fibers and fiber bundles cooperating with one another in a random fashion to from said web such that
        (i) said monofilament fibers and fiber bundles are substantially randomly oriented and uniformly dispersed throughout said web and,
        (ii) a majority of the ends of said bundles are within the confines of said web.

2. An improvement according to claim 1 wherein said mat has a weight of between approximately 2.00 and 2.40 lbs/100 sq. ft.

3. An improvement according to claim 1 wherein said glass fiber bundles are comprised of monofilament fibers between approximately 12 microns and 19 microns in diameter.

4. An improvement according to claim 1 including approximately 15% binder substance by dry weight of said mat.

5. An improvement according to claim 1 wherein each of said glass fiber bundles is comprised of between approximately 20 and 300 monofilaments.

6. An improvement according to claim 1 wherein said product is a roofing shingle.

* * * * *